United States Patent
Park (10) Patent No.: US 10,887,201 B2
(45) Date of Patent: Jan. 5, 2021

(54) METHOD FOR AUTOMATICALLY MONITORING END-TO-END END USER PERFORMANCE AND APPARATUS FOR PERFORMING THE METHOD

(71) Applicant: GREENISLE INC., Seoul (KR)

(72) Inventor: Byung Nyun Park, Hanam-si (KR)

(73) Assignee: GREENISLE INC., Seoul (KR)

( * ) Notice: Subject to any disclaimer, the term of this patent is extended or adjusted under 35 U.S.C. 154(b) by 0 days.

(21) Appl. No.: 16/616,186

(22) PCT Filed: Jun. 1, 2018

(86) PCT No.: PCT/KR2018/006271
§ 371 (c)(1),
(2) Date: Nov. 22, 2019

(87) PCT Pub. No.: WO2018/221997
PCT Pub. Date: Dec. 6, 2018

(65) Prior Publication Data
US 2020/0213208 A1    Jul. 2, 2020

(30) Foreign Application Priority Data

Jun. 2, 2017 (KR) .................. 10-2017-0068998

(51) Int. Cl.
*H04L 12/26* (2006.01)
*G06F 11/30* (2006.01)
*G06Q 50/10* (2012.01)
*H04L 29/08* (2006.01)

(52) U.S. Cl.
CPC .......... *H04L 43/045* (2013.01); *G06F 11/302* (2013.01); *G06F 11/3006* (2013.01); *G06F 11/3051* (2013.01); *G06F 11/3055* (2013.01); *G06Q 50/10* (2013.01); *H04L 67/02* (2013.01)

(58) Field of Classification Search
CPC .... H04L 43/045; H04L 67/02; G06F 11/3006; G06F 11/302; G06F 11/3051; G06F 11/3055
See application file for complete search history.

(56) References Cited

U.S. PATENT DOCUMENTS

2005/0262104 A1    11/2005   Robertson et al.
2006/0085420 A1*   4/2006    Hwang .............. G06F 11/3419
2008/0228863 A1    9/2008    Mackey
(Continued)

FOREIGN PATENT DOCUMENTS

KR    10-2014-0054480    5/2014

*Primary Examiner* — Viet D Vu
(74) *Attorney, Agent, or Firm* — Miles & Stockbridge P.C.

(57) ABSTRACT

The present invention relates to a method for automatically monitoring end-to-end end user performance and an apparatus for performing the method. The method for automatically monitoring end-to-end end user performance comprises the steps of: an application server receiving a performance analysis component; and an application server installing the performance analysis component, wherein the performance analysis component may add a monitoring script to a reply by an application to service a hypertext markup language (HTML) page with a web browser, wherein the monitoring script may collect and provide end user performance monitoring information relating to an event generated from the HTML page.

7 Claims, 5 Drawing Sheets (56) References Cited

U.S. PATENT DOCUMENTS

| | | |
|---|---|---|
| 2015/0304398 A1 | 10/2015 | Letca et al. |
| 2015/0378756 A1 | 12/2015 | Lensmar et al. |
| 2015/0378864 A1* | 12/2015 | Lensmar ............ G06F 11/3414 717/130 |
| 2016/0044083 A1* | 2/2016 | Galloway ............... H04L 67/02 709/217 |

* cited by examiner

METHOD FOR AUTOMATICALLY MONITORING END-TO-END END USER PERFORMANCE AND APPARATUS FOR PERFORMING THE METHOD

PRIORITY INFORMATION

The present application is a national stage filing under 35 U.S.C. § 371 of PCT/KR2018/006271, filed on Jun. 1, 2018, which claims priority to KR Application No. 10-2017-0068998 filed on Jun. 2, 2017. The applications are incorporated herein by reference in their entirety.

TECHNICAL FIELD

The present invention relates to a method for automatically monitoring end-to-end end user performance and an apparatus for performing the method. More particularly, the present invention relates to a method and an apparatus for monitoring an error status of a client and end-to-end performance from the client to a server in order to improve quality of user experience of an end user.

BACKGROUND ART

The field of web services has already been an essential field of enterprise business through distribution and propagation of the Internet. In order to improve quality of user experience for a web service, which is one of core services of the enterprise business, efforts of enterprises for improving performance suitable for users and reducing a frequency of errors which may be generated in various user terminal environments tend to naturally lead to an interest in related technologies.

Conventional techniques for managing the quality of the user experience of the end user are limited to the level of monitoring performance by measuring a response time of a user terminal.

In some of the conventional techniques, a separate agent such as Active-X is installed in the user terminal such as a web browser to monitor a user response time of the end user, which may cause problems such as compatibility problems and inconvenience due to installation.

In addition, in another conventional technique, a separate dedicated server for monitoring end user performance is installed in a network section of the server to collect the user response time based on a network transmission time.

Further, in still another conventional technique, the user response time of the end user is measured to monitor the network transmission time and an application processing time based on GUID. All of such conventional techniques have problems in terms of the quality of the user experience that only performance such as the response time is monitored, and quality such as error occurrence may not be monitored.

In addition, in terms of efficiency of the performance monitoring, since a manual work such as a preliminary preparation work such as installation for the monitoring is required, so that efficiency and immediacy may be degraded.

Further, in terms of the end user performance, during an entire process from the start of an event, such as a button click operation of a user to request a service, to a response to a next event of the user by a page after the completion of a service response, there is a problem that performance indicators for a network connection preparation step before a request, a page loading step after receiving a response from a server, and the like may not be collected in the conventional techniques, and only a response time for a server request may be managed.

Moreover, in a method of monitoring by linking end user performance information with application processing performance information in an end-to-end manner, only linkage using event-based GUID is possible, and end-to-end performance monitoring based on a page on a user screen may not be performed.

Therefore, there is a demand for a novel method that may overcome the problems and technical limitations of the related art to provide effective monitoring techniques for improving the quality of the user experience.

DETAILED DESCRIPTION OF THE INVENTION

Technical Problem

An object of the present invention is to solve all the above-described problems.

In addition, another object of the present invention is to automatically monitor performance and an error status of a web page of an end user without modifying the web page so that server-side performance information may be tracked in an end-to-end manner in order to improve quality of user experience of the end user in web services of an enterprise.

In addition, still another object of the present invention is to provide an automated method that does not require installation of an agent or modification to the web page in order to overcome immediacy and efficiency problems caused by a scheme in which an agent is installed on a client terminal or a web page is modified in end-user performance monitoring.

In addition, yet another object of the present invention is to track and monitor end-to-end performance information from a client to a server in a unit of a web page on a client side.

Technical Solution

The representative configuration of the present invention for achieving the above objects is as follows.

According to one aspect of the invention, a method for analyzing end-to-end end user performance includes: receiving a performance analysis component by an application server; and installing the performance analysis component by the application server, wherein the end user performance analysis application adds a monitoring script to a reply by an application to service a hypertext markup language (HTML) page with a web browser, and the monitoring script collects and provides end user performance monitoring information on an event occurring in the HTML page.

According to another aspect of the invention, an application server which is an analysis target for analyzing end-to-end end user performance includes: a communication unit implemented to receive a performance analysis component; and a processor operatively connected with the communication unit, wherein the processor is implemented to install the performance analysis component, the performance analysis component adds a monitoring script to a reply by an application to service a hypertext markup language (HTML) page with a web browser, and the monitoring script collects and provides end user performance monitoring information on an event occurring in the HTML page.

Advantageous Effects of the Invention

According to the present invention, performance and an error status of a web page of an end user can be automatically monitored without modifying the web page so that server-side performance information can be tracked in an end-to-end manner in order to improve quality of user experience of the end user in web services of an enterprise.

In addition, an automated method that does not require installation of an agent or modification to the web page can be provided in order to overcome immediacy and efficiency problems caused by a scheme in which an agent is installed on a client terminal or a web page is modified in end-user performance monitoring.

In addition, end-to-end performance information can be tracked and monitored from a client to a server in a unit of a web page on an end user side.

In addition, collected data such as a moving route for a web page of a user and a combination of search keywords can be used as source data for a product recommendation system that adopts business activity monitoring (BAM) or artificial intelligence (AI) in an e-commerce market.

BEST MODE

In the following detailed description of the present invention, references are made to the accompanying drawings that show, by way of illustration, specific embodiments in which the invention may be practiced. These embodiments are described in sufficient detail to enable those skilled in the art to practice the invention. It shall be understood that various embodiments of the invention, although different from each other, are not necessarily mutually exclusive. For example, specific shapes, structures, and characteristics described herein may be implemented as being modified from one embodiment to another embodiment without departing from the spirit and scope of the invention. Furthermore, it shall be understood that locations or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout several aspects.

Hereinafter, various preferred embodiments of the present invention will be described in detail with reference to the accompanying drawings to enable those skilled in the art to which the invention pertains to easily implement the invention.

Hereinafter, since specific program languages, communication protocols, transmission protocols, and the like disclosed in an embodiment of the present invention are provided as one example, various other program languages, communication protocols, transmission protocols, and the like may be used, and such embodiments may also fall within the scope of the present invention.

In a method for automatically monitoring end-to-end end user performance according to the embodiment of the present invention, monitoring information such as web page performance information and script error may be collected and sent to a server through a monitoring script written in pure JavaScript based on a web standard technology.

The monitoring script may be operated by automatically inserting a hypertext markup language (HTML) link tag of the monitoring script according to an HTML transmission protocol when a stream of a corresponding page is written to a client through a network output module of an application server as a monitoring on/off state of the server is changed.

In the operation of the monitoring script performed as described above, a specific page and an internet protocol (IP) of a specific end user may be dynamically and automatically monitored, and efficiency of end user performance monitoring can be improved.

In order to collectively show the corresponding page in a unit of a user page and a plurality of server service calls, such as Ajax calls, generated on the corresponding page by a unit of a single page work, end to end performance may be tracked by issuing a universally unique identifier (UUID) and assembling calling/called associative relation between related services on a server side by using a referrer of a hypertext transfer protocol (HTTP) request, uniform resource locator (URL) information, and cookie information.

Through the above method for monitoring end user performance, performance monitoring of an end user may be performed in an end-to-end manner in real time without installing a separate user terminal agent or modifying a web page.

Figure 1:
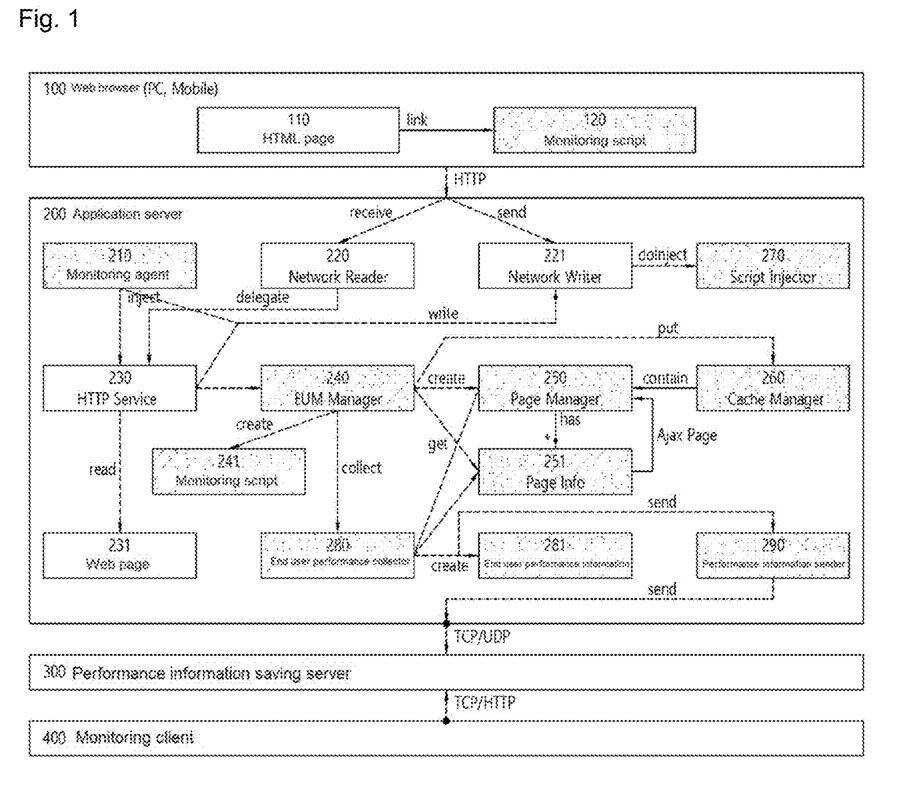
FIG. 1 is a conceptual diagram illustrating an end user performance monitoring system according to an embodiment of the present invention.

FIG. 1 is a conceptual diagram illustrating a system for automatically monitoring end-to-end end user performance according to an embodiment of the present invention.

Referring to FIG. 1, an end user performance monitoring system may include a web browser 100, an application server 200, a performance information saving server 300, and a monitoring client 400.

The web browser 100 is subject to the end user performance monitoring. The web browser 100 may display a hypertext markup language (HTML) page, which is a user interface (UI) of an end user using web services of an enterprise, and process an event. In a process of processing the event, information may be collected by a monitoring script 120 inserted through monitoring automation on the web browser, and the collected information may be sent to the application server 200. The application server 200 may generate end user performance information 281 based on the collected information, and analyzed end user performance information 281 may be sent to the performance information saving server 300.

The application server 200 may be middleware such as a web application server (WAS) on which an application for providing a web service to the end user is executed. A monitoring agent 210 may be executed in the form of a library in the application server so that a monitoring script link tag may be automatically inserted upon network output of the HTML page of the application server 200, and event monitoring information (or monitoring information) of the web browser 100 may be collected. The monitoring information collected by the web browser 100 may be transmitted to the application server 200 which services the HTML page, and finally stored in the performance information saving server 300. The monitoring information may also be referred to as end user performance monitoring information.

The application server 200 may receive an end user performance analysis application from an external device, and install the end user performance analysis application to perform end user performance analysis.

The performance information saving server 300 may store the end user performance information 281 received from the application server 200 in a memory cache and an internal storage. The end user performance information 281 collected as described above may be output to a manger screen by a performance information data request of the monitoring client 400.

The monitoring client 400 may display various performance statuses on a performance dashboard screen, and such information may be acquired by requesting the information from the performance information saving server 300.

Hereinafter, a specific operation for monitoring the end user performance will be described.

The web browser 100 may be used to utilize a web service of a specific enterprise. Both embedded browsers of a personal computer (PC) and a mobile device may correspond to the web browser 100, and the web browser 100 may operate on HTML-based pages. When a service is requested from the application server 200 and an HTML page 110 is received as a result page, a page including a link for the monitoring script 120 may be transmitted depending on the setting of the monitoring for the end user performance information 281.

Various events may occur in a process of rendering the HTML page 110 by the web browser 100, and the monitoring information for each event may be recorded in a specific performance object (e.g., window.performance.timing). Performance objects may vary depending on a type of the web browser. In addition, an additional Ajax call to the application server 200 through XMLHttpRequest may be generated by javascript included in the page during an initialization process after termination of the rendering of the page.

The monitoring script 120 may wrap events of the HTML page 110 to collect information related to page loading, Ajax calls, and script errors and send the information to the application server 200. In order to reduce a frequency of calls with the application server, the monitoring information may be collected by a reference value (e.g., 5) set in a queue size (QUEUE_SIZE) so as to be sent at one time. In this case, when a predetermined queuing time (QUEUING_TIME) is exceeded, the monitoring information may be sent to the server even if a queue is not occupied.

When a process of the application server 200 is started, the monitoring agent 210 may also be loaded in the form of a library. The application server 200 may load binary codes of modules required in a startup process into a memory.

At this time, the monitoring agent 210 may insert a code for calling a script injector 270 at the start of a network writer 221, and insert a code for calling an end user monitoring manager (EUM manager) 240 at the start of an HTTP service 230.

The network reader 220 may serve to receive an HTTP request from the web browser 100 and send the HTTP request to the HTTP service 230.

The network writer 221 may serve to receive an HTTP response stream of the HTTP service 230 and send the response to the web browser 100. The script injector 270 may be requested to perform a task for inserting the monitoring script before sending the HTTP response stream.

The HTTP service 230 may serve to process a request of a client (e.g., HTTP client) and generate a corresponding result. At the start of the HTTP service 230, the EUM manager 240 may be called to request an end user monitoring task. When all tasks are completed, a result stream may be sent to the network writer 221 to send a request result to the client.

The EUM manager 240 may mainly perform three roles.

The EUM manager 240 may generate a file of the monitoring script 241 in a web context root when initially receiving the HTTP request from the client.

In addition, the EUM manager 240 may provide a service for configuring a processing result of the service request of the end user in the form of a web page, and manage information of the resulting web page to enable end-to-end tracking. The EUM manager 240 may perform the following operations for the end-to-end tracking.

A visitor key (VISITOR_KEY), which is a UUID for the end user, may be generated to identify the end user, and a value thereof may be recorded in the cookie information of an HTTP response object.

In addition, one page manager 250 may be generated for each end user, and a page info 251 containing information of a current page required for the end-to-end tracking may be generated and recorded in the page manager 250.

Information about the page manager 250 may be registered in a cache manager 260 based on a value of the visitor key (VISITOR_KEY).

In addition, the EUM manager 240 may transmit the monitoring information collected on the web browser 100 to an end user performance collector 280.

The monitoring script 241 may be generated as a file by the EUM manager 240, and may be downloaded and loaded on the web browser 100 when a link call is generated in the HTML page 110. When the monitoring script 241 is generated, a version number may be added to a file name to prevent a cache of the web browser 100 when the monitoring script 241 is changed.

The page manager 250 may perform a role of recording and maintaining N page info 251 in an internal structure. There may be two types of page managers 250. One is an HTML page manager, and the other is an Ajax page manager. In addition, there may be two types of page info 251. One is an HTML page info, and the other is an Ajax page info.

The page manager 250 may be formed therein with a structure that may contain the N page info 251.

The page manager 250 may manage the structure based on a getPage/setPage function which uses a uniform resource locator (URL) or a referrer as a key.

When a set page function (setPage(url, pageInfo)) is executed, existing pages may be moved to the right one by one, and a new page may be recorded in a first array. The structure may be configured in the form of first-in first-out (FIFO), so that an initial page may be deleted from the structure when more than N pages are provided. In this manner, up to N multiple pages, such as another embedded page or a pop-up page, in the web page may be simultaneously monitored. For example, a default value of N may be 5.

The page info 251 may include matching information for matching call information of the client with the monitoring information sent to the application server. In other words, the page info 251 may include information for matching information about the web page with the monitoring information sent to the application server (or end user performance collector). The matching information for matching the call information of the client with the monitoring information sent to the application server may include page type, txId, callee txId, url, ajax page manager, and the like. The page info 251 may further include matching information for linking the end user performance monitoring information of the HTML page with call relation between HTML pages and processing performance information of the HTML page and the application, and the end user performance monitoring information may be sent to the end user performance collector based on the matching information to generate end-to-end end user performance information.

The following is a description of the matching information.

page type is a page type classification, and may be HTML or Ajax.

txId is a UUID for identifying a corresponding page call.

callee txId is an application server-side UUID for processing a request for a page call.

url is information on an URL called by the page. A specific page info 251 may be found by matching the page info 251 with the URL on the monitoring information about the page collected by the client based on the matching information.

ajax page manager may be used to manage internal Ajax call information when page_type is HTML.

The cache manager 260 may store the page manager 250 for a predetermined cache time based on a VISITOR_KEY value.

The script injector 270 may parse an HTTP response stream to insert the monitoring script link. The above operation may be performed only when a current setting value for determining whether to perform the monitoring is set as true, and comparison may be performed based on setting values of a monitoring target URL pattern and a monitoring target client IP address pattern to perform limited monitoring only on URLs and user IPs that match the patterns. Accordingly, the monitoring may be efficiently performed only on targets that require dynamic monitoring during runtime.

Once a monitoring target is determined, first, a case in which content-type in a response header satisfies a specific format (e.g., text/html format) may become the monitoring target, and other document formats may be bypassed. Next, a transfer-encoding value may be acquired. HTTP transmission schemes are classified into two types, which are a chunked scheme and a content-length scheme. A protocol according to the transmission scheme may conform to RFC2616, which is a standard protocol for an HTTP protocol.

The important thing is that the response stream may be parsed according to such an HTTP transmission protocol to find an insertion position (e.g., default value: right after a <head> tag) of the monitoring script link defined in the setting value, the monitoring script link may be inserted in the position, and a string length of an added link may be added to a transmission length in the existing transmission protocol to modify a value and send the response. As such, a monitoring code may be inserted into a corresponding page source in a dynamic automated scheme rather than a static modifying scheme during the runtime, so that immediacy and efficiency may be ensured. Such a scheme of inserting the monitoring script link may also be defined as HTTP byte code injection (HBCI).

The method for automatically monitoring the end-to-end end user performance according to the embodiment of the present invention may be may be classified into byte stream handling and string stream handling depending on an adopted program language or a type of target middleware (web server; WAS), or may adopt a combination of the byte stream handling and string stream handling.

A body sign that indicates the start of a body in the HTTP protocol is four consecutive characters which are CR (13), LF (10), CR (13), and LF (10). In the transmission in the chunked scheme, repetitive transmission may be performed in the form such as length+contents+length+contents, and the transmission may be finished by sending 0 as a length at the end. In this case, a length sign may include a transmission length number (hexadecimal number), CR (13), and LF (10).

The end user performance collector 280 may receive the monitoring information, which is collected from the web browser 100, from the EUM manager 240 to generate the end user performance information 281, and send the end user performance information 281 to the performance information saving server 300 through a performance information sender 290.

In addition, the end user performance collector 280 may serve to correct a time of the client. A time of a user device may not be synchronized with a standard time zone so that the time may vary. Accordingly, the time may be synchronized by comparing the time with a server time based on a send time in the monitoring information, and applying a gap obtained by the comparison as a correction value.

The monitoring information collected by the monitoring script 120 in the web browser 100 may be sent to a performance collection endpoint url defined in the monitoring script 120.

When a request url matches the performance collection endpoint url, the EUM manager 240 may transmit information to the end user performance collector 280.

Hereinafter, a role of the end user performance collector 280 will be described in detail.

HTML page manager type information of the page manager 250 may be acquired from the cache manager 260 by extracting the VISITOR_KEY value from the cookie information based on the request of the client. HTML page info type information of the page info 251 may be acquired by calling getPage(referrer) by using referrer information of a corresponding request header as a key in the HTML page manager.

In addition, a send time value may be acquired based on the request of the client, and a gap time with respect to a current server time may be calculated. Thereafter, the gap time may be calculated as a correction value at every event occurrence time of the client and used for the time synchronization.

In addition, a page count value may be acquired based on the request of the client, and a while loop may be performed by the number of times corresponding to the value. One screen may be composed of a plurality of pages, and it may be necessary to collect the end user performance information for the plurality of pages. In this case, the page count value may be acquired, and the while loop may be performed by the number of times corresponding to the value.

The information about the page or the monitoring information may be sent in the form of a bulk to include a plurality of pieces of monitoring information, and the information about the number of pieces of monitoring information may be included in a page count.

An EUM type value may be acquired from the corresponding request while performing the while loop by the number of page counts. An EUM type includes three types, in which all the three types may commonly generate the end user performance information 281, and may collect common information and transaction tracking information to record the common information and the transaction tracking information in the end user performance information 281. The detailed description of each of the types will be described below in the description related to the end user performance information 281.

When the EUM type is an Ajax page, Ajax page info type information of the page info 251 may be acquired by acquiring an Ajax call url value from the corresponding request to call getPage(ajax_call_url) from the Ajax page manager of the HTML page info.

The Ajax page info type information may be recorded in the transaction tracking information of the end user performance information 281, and additionally, the txId of the HTML page info may be delegated to the caller txId of the end user performance information 281.

When the EUM type is an HTML page, the monitoring information may be collected from the corresponding request and recorded in the performance information of the end user performance information 281, and the HTML page info type information may be recorded in the transaction tracking information of the end user performance information 281.

When the EUM type is a script error page, error information may be collected from the corresponding request and recorded in the error information of the end user performance information 281, and additionally, a new UUID may be generated and delegated to the txId of the end user performance information 281.

When the while loop is terminated, the collected end user performance information 281 may be sent to the performance information saving server 300 through the performance information sender 290.

The end user performance information 281 may include the common information, the transaction tracking information, the performance information, the error information, and the like. The common information, the transaction tracking information, the performance information, the error information, and the like may be generated based on the monitoring information and the page info information monitored by the monitoring script.

The end user performance information 281 may be generated by the end user performance collector 280. The end user performance information 281 may be mainly classified into three types according to the EUM type as follows.

Next, the common information included in the end user performance information 281 will be described.

The common information may include EUM type information, url information, and information on a referrer, a user agent, a client IP, a user ID, a WAS ID, a send time, a start time, an end time, and an elapsed time. The following is a description of the common information.

EUM type information is an end user monitoring type, and may be information for identifying three types such as an HTML page, an Ajax page, and a script error page.

url information may include information on the request url of the corresponding page.

referrer may include information on a url of the page which has sent the corresponding request url.

user agent may include information on a type of a web browser engine.

client IP may include information on an IP address of an end user terminal.

user ID may include information on identification information (ID) of the user.

WAS ID may include information on an ID of a server instance providing the HTTP service.

send time may include information on a time at which the performance information is sent from the client.

start time may include information on a time at which the corresponding page is started at the client.

end time may include information on a time when the corresponding page is terminated at the client.

elapsed time may include information on a time elapsed between the start and the termination of the corresponding page.

Next, the transaction tracking information will be described.

The transaction tracking information may include information about txId, caller txId, and callee txId. The following is a description of the transaction trace information.

txId is a UUID for identifying a call of a corresponding client page, and may be delegated from the txId of the page info 251.

caller txId is the txId of the page that has sent a corresponding client page request, and may be delegated from the txId of the page info 251 which is formed in an HTML page info type only when the EUM type (eum_type) is the Ajax page.

callee txId is a transaction UUID on a server side that has processed the request for a corresponding client page call, and may be delegated from the callee txId (callee_txId) of the page info 251.

Next, the performance information will be described. The performance information may be acquired only from an HTML page type. The unit of the performance information may be milliseconds. The performance information may include information on a prepare time, a response time, and a loading time.

prepare time may include information on a time required from the start of the page before the server request (requestStart-navigationStart).

response time may include information on a time required from the server request to the completion of a server response (responseEnd-requestStart).

loading time may include information on a time required from the completion of the server response until the termination of the page (loadEventEnd-responseEnd).

window.performance.timing may be the performance information embedded according to the standard protocol for HTML documents.

Next, the error information will be described. The error information may be acquired only from a script error page type. The error information may include information on an error stack, an error message, an error line, and an error column.

error stack may contain stack trace information for tracking a stack where a script error has occurred.

error message may be a script error message.

error line may be a line number where the script error has occurred.

error column may be a column number where the script error has occurred.

The service performance information sender 290 may serve to convert the end user performance information 281 received from the end user performance collector 280 into a byte stream to send the byte stream to the performance information saving server 300 in a UDP protocol. A UDP transmission scheme rather than a TCP transmission scheme may be used to rapidly process performance, which is called at a high frequency, to store the performance information in a remote storage.

The performance information saving server 300 may record the end user performance information 281 received from the application server 200 in the internal storage, and provide the end user performance information 281 to the monitoring client 400.

The monitoring client 400 may request the end user performance information 281 from the performance information saving server 300, and may visualize and display the end user performance information 281.

Figure 2:
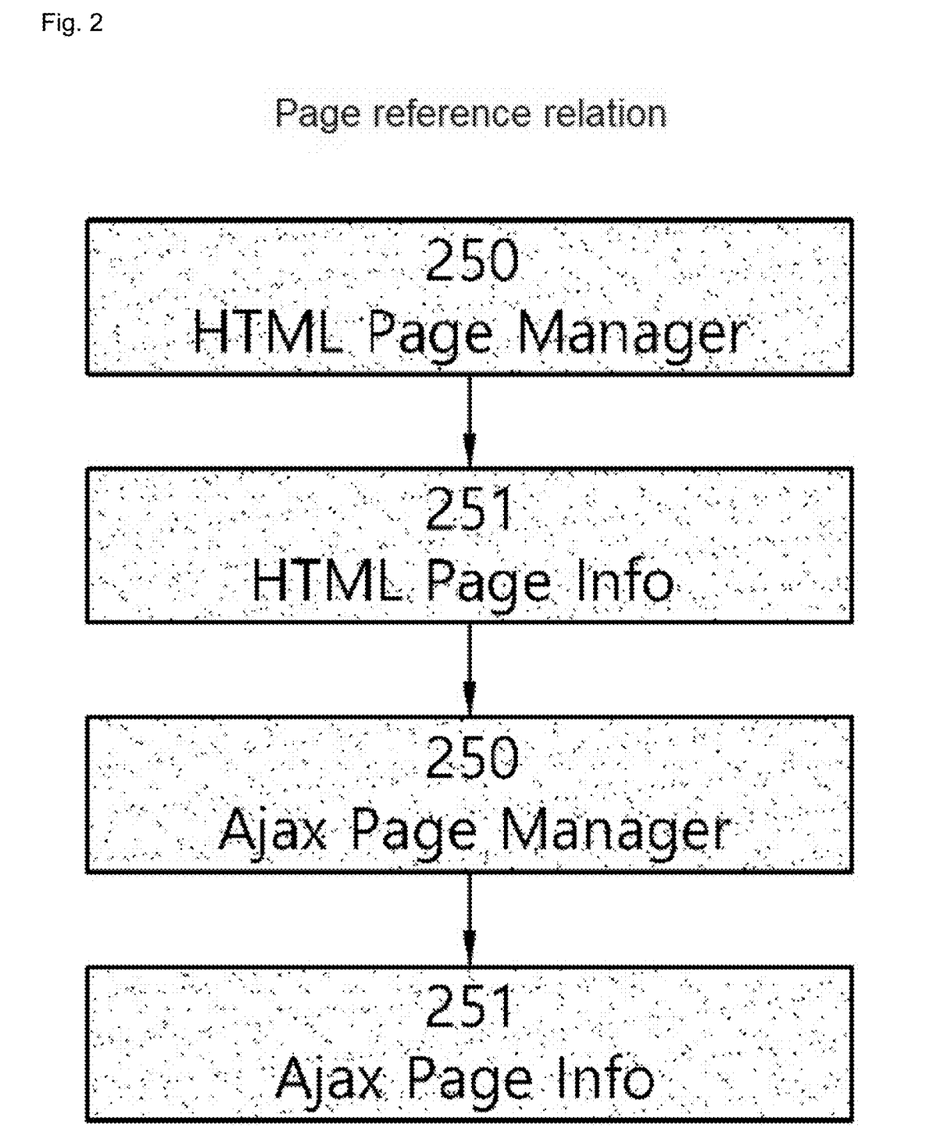
FIG. 2 is a conceptual diagram illustrating reference relation between pages according to the embodiment of the present invention.

FIG. 2 is a conceptual diagram illustrating reference relation between pages according to the embodiment of the present invention.

As described above, there may be two types of page managers 250, and the two types may include the HTML page manager and the Ajax page manager. In addition, there may be two types of page info 251, and the two types may include the HTML page info, and the Ajax page info.

Referring to FIG. 2, the HTML page info may be referenced by an HTML page manager 250.

As described above, first, the HTML page manager type information of the page manager 250 may be acquired from the cache manager 260 by extracting the VISITOR_KEY value from a cookie of the corresponding request. The HTML page info type information of the page info 251 may be acquired by calling getPage(referrer) by using the referrer information of the corresponding request header as a key in the HTML page manager.

The Ajax page manager may be referenced by the HTML page info, and the Ajax page info may be referenced by the Ajax page manager.

In detail, when the EUM type is the Ajax page, the Ajax page info type information of the page info 251 may be acquired by acquiring the Ajax call url value from the corresponding request to call getPage(ajax_call_url) from the Ajax page manager of the HTML page info.

Figure 3:
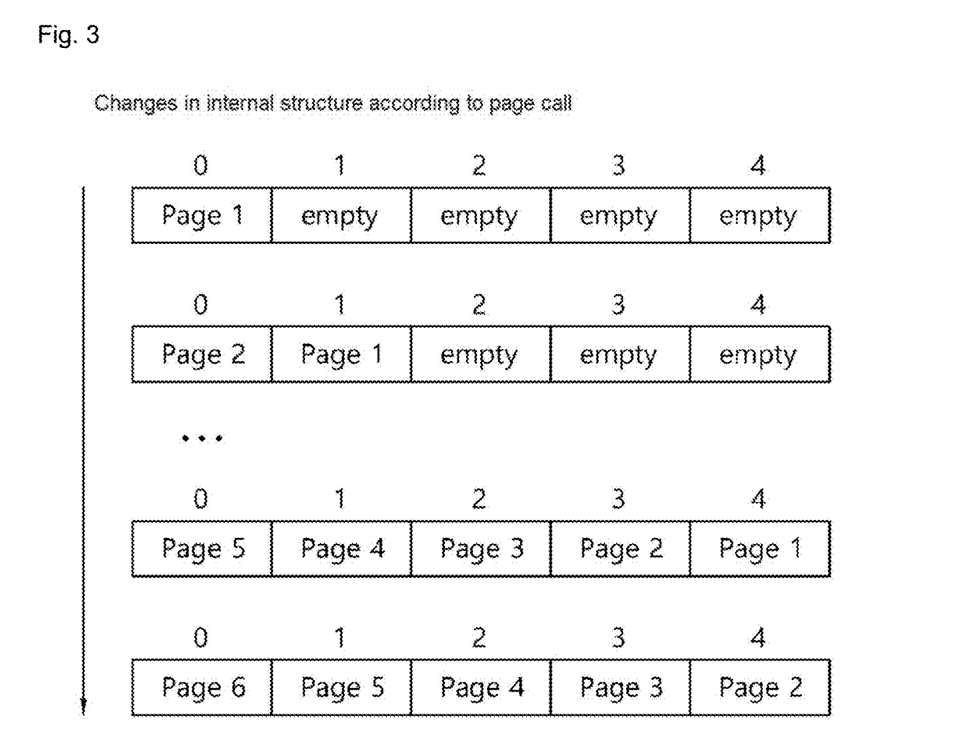
FIG. 3 is a conceptual diagram illustrating changes in a structure of a page manager according to a page call according to the embodiment of the present invention.

FIG. 3 is a conceptual diagram illustrating changes in the internal structure of the page manager 250 according to the page call according to the embodiment of the present invention.

Referring to FIG. 3, the page manager 250 may be formed therein with the structure that may contain the N page info 251.

As described above, the page manager 250 may manage the structure based on the getPage/setPage function which uses the URL or the referrer as a key.

When the set page function (setPage(url, pageInfo)) is executed, the existing pages may be moved to the right one by one, and a new page may be recorded in the first array. The structure may be configured in the form of first-in first-out (FIFO), so that the initial page may be deleted from the structure when more than N pages are provided. In this manner, up to N multiple pages, such as another embedded page or a pop-up page, in the web page may be simultaneously monitored. For example, the default value of N may be 5.

Figure 4:
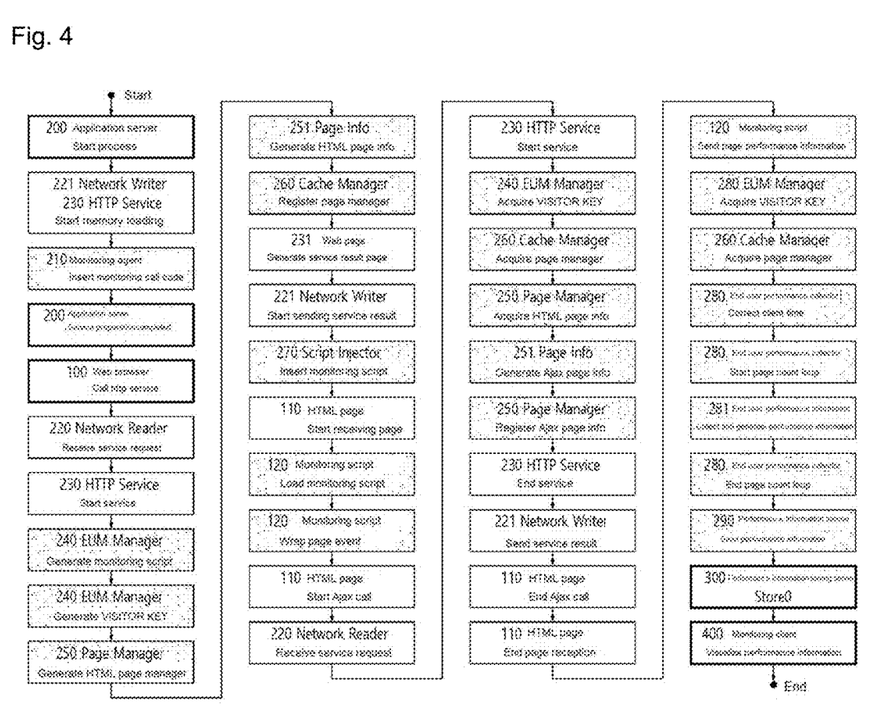
FIG. 4 is a flowchart illustrating a method for monitoring end user performance according to the embodiment of the present invention.

FIG. 4 is a flowchart illustrating a method for automatically monitoring end-to-end end user performance according to the embodiment of the present invention.

Referring to FIG. 4, a process of the application server 200 may be started (S402).

Memory loading may be performed for binary codes of the network writer 221 and an HTTP service module 230 with the start of the process of the application server 200 (S404).

The monitoring agent 210 may insert the code for calling the script injector 270 at the start of the network writer 221 (S406). In addition, the code for calling the EUM manager 240 may be inserted at the start of the HTTP service 230.

The application server 200 may complete the memory loading for all modules required for the service and complete service preparation (S408).

The user may call the HTTP service of the application server 200 through the web browser 100 (S410).

The network reader 220 may receive the request of the web browser and send the request to the HTTP service 230 (S412).

The HTTP service may call the EUM manager 240 at the start of the service (S414).

The EUM manager 240 may generate a file of the monitoring script in a web context root path when initially receiving the HTTP request (S416).

Thereafter, the EUM manager 240 may extract the VISITOR_KEY from the cookie of the HTTP request header (S418). At this time, if there is no VISITOR_KEY, the user may be determined as a user who has visited for the first time, and the VISITOR_KEY may be generated and recorded in an HTTP response cookie.

The page manager 250 may be generated in the HTML page manager type by the EUM manager 240 (S420).

After generating the HTML page manager, the HTML page info may be generated as the page info 251 (S422). When generating the HTML page info, a structure that may contain N page info 251 therein may be generated. The page info may be generated in the HTML page info type by the EUM manager 240. When generating the page info, the page manager 250 which is formed in the Ajax page manager type may be generated in the page info to manage the Ajax page. In addition, txId required for the end-to-end tracking may be generated, and txId of a current service may be delegated to callee_txId. Finally, after url information of a current request is delegated, the page manager 250 may call setPage(url, pageInfo) to perform recording.

The HTML page manager type information generated above by using the VISITOR_KEY as a key value may be registered in the cache manager 260 by the EUM manager 240 (S424).

The HTTP service 230 may read the web page 231 to generate a request result page (S426).

A web page result stream 231 may be transmitted to the network writer 221, and a result may be sent to the web browser 100 (S428).

The script injector 270 may be called at the start of the transmission of the network writer 221 to perform a monitoring script insertion operation (S430).

The HTML page 110 may receive a service result page from the network writer 221 (S432).

The monitoring script 120 may be downloaded from the application server 200 by the monitoring script link tag inserted after a <head> tag of the result page (S434).

After the monitoring script 120 is downloaded, the monitoring script 120 may wrap and monitor all events related to performance and errors of the HTML page 110 in a loading process (S436).

The Ajax calls included in the HTML page 110 may be performed (S438). The request may be transmitted to the EUM manager 240 through the network leader 220 (S440) and the HTTP service 230 (S442).

The EUM manager 240 may determine the Ajax call by reading the content-type of the HTTP request header. First, the EUM manager 240 may acquire the VISITOR_KEY from a cookie of the request header (S444).

The EUM manager 240 may acquire the page manager 250, which is formed in the HTML page manager type, from the cache manager 260 by using the VISITOR_KEY as a key value (S446).

The EUM manager 240 may acquire the HTML page info type from the page manager 240 by calling getPage(referrer) by using the referrer information acquired from the HTTP request header as a key (S448).

The page info 251 may be generated by the EUM manager 240 in the Ajax page info type (S450). Upon the generation, the txId required for the end-to-end tracking may be generated, and the txId of the current service may be delegated to the callee_txId. Finally, the url information of the current request may be delegated.

Ajax page manager type information of the page manager 250 may exist in internal information of the HTML page info type acquired as described above, and the recording may be performed by calling setPage(url, ajaxPageInfo) of the Ajax page manager (S452).

When the service of the HTTP service 230 is terminated (S454), and the service result is sent through the network writer 221 (S456), the Ajax call of the HTML page 110 may be terminated (S458). Subsequently, even the reception of the HTML page 100 is terminated (S460).

The monitoring script 120 records monitoring performance information of all the events performed so far in an internal queue, and when the queue size reaches a preset transmission size (e.g., 5), the collected monitoring information may be sent to the performance collection endpoint url defined in the monitoring script. When the request url matches the performance collection endpoint url, the EUM manager 240 may transmit corresponding monitoring information to the end user performance collector 280 (S462).

The end user performance collector 280 may extract the VISITOR_KEY value from a cookie of a corresponding HTTP request header (S464).

The HTML page manager type information may be acquired from the cache manager 260 by using the VISITOR_KEY as a key (S466). The HTML page info type information may be acquired by calling getPage(referrer) by using the referrer information of the corresponding request header as a key in the HTML page manager.

Next, the end user performance collector 280 may acquire the send time value from the request, and perform time correction with respect to the current server time (S468).

Next, the end user performance collector 280 may acquire the page count value from the request, and perform the while loop by the number for times corresponding to the value (S470). The monitoring information about the page may be sent in the form of a bulk to include a plurality of pieces of monitoring information, and the number of pieces of monitoring information may be included in the page count.

The end user performance information 281 may be generated in three types, which are the Ajax page, the HTML page, and the script error page, by the EUM type value acquired from the corresponding request while performing the while loop. The common information, the transaction tracking information, the performance information, and the error information may be collected and recorded according to the type of the generated end user performance information 281 (S472).

The page count loop of the end user performance collector 280 may be terminated (S474).

The performance information sender 290 may receive the end user performance information 281 and transmit the end user performance information 281 to the performance information saving server 300 (S476).

The store of the performance information saving server 300 may store the end user performance information 281 received from the performance information sender 290 (S478).

The monitoring client 400 may request the end user performance information from the performance information saving server 300, and may visualize and display a result thereof (S480).

Figure 5:
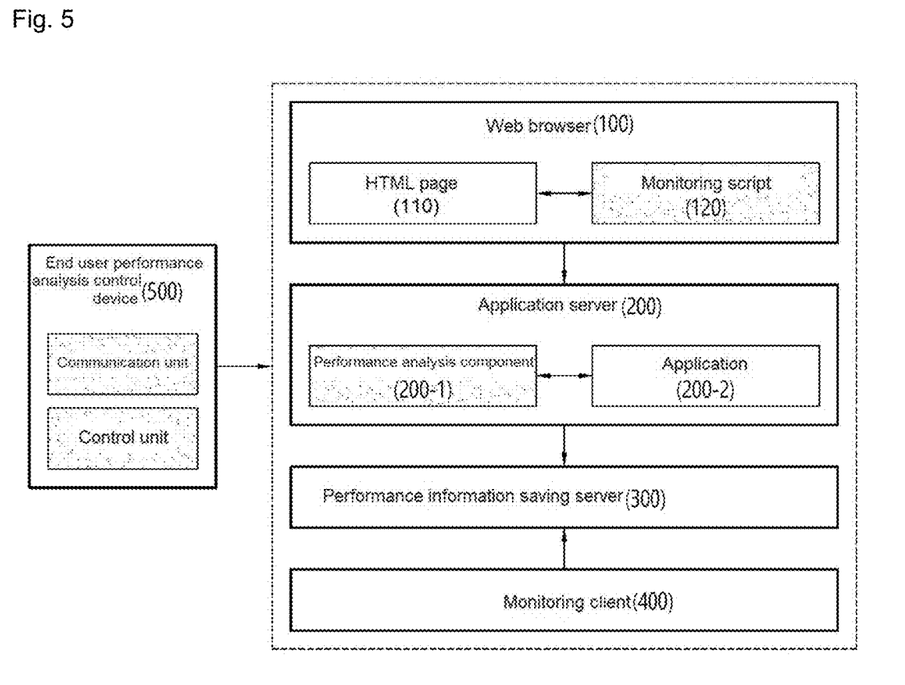
FIG. 5 is a conceptual diagram illustrating a method for providing an end user performance analysis service to monitor the end user performance according to the embodiment of the present invention.

FIG. 5 is a conceptual diagram illustrating a method for providing an end user performance analysis service to automatically monitor the end-to-end end user performance according to the embodiment of the present invention.

Referring to FIG. 5, a system for providing an end user performance analysis service on the network described above with reference to FIGS. 1 to 4 will be described.

Referring to FIG. 5, an end user performance analysis control device 500 may be a device for providing the end user performance analysis service to a monitoring client side. The end user analysis control device 500 may be a subject that provides an application for the end user performance analysis service. For example, the end user analysis control device 500 may be a server (or computer) for sending an end user performance analysis application or a storage medium such as a USB.

The end user performance analysis control device 500 may include a processor and a communication unit, wherein the processor may be implemented for a control for driving the end user performance analysis control device 500, and the communication unit may be operatively connected to the processor to perform communication with the application server 200, the performance information saving server 300, and the monitoring client 400. Alternatively, the end user performance analysis control device may include the communication unit and the processor, and may be implemented to send only the end user performance analysis application (or performance analysis component 200-1).

In addition, an application server which is an analysis target for analyzing the end-to-end end user performance may include a communication unit implemented to receive the end user performance analysis application (or performance analysis component 200-1), and a processor operatively connected with the communication unit. The processor may be implemented to install the end user performance analysis application.

The performance analysis component 200-1 may drive operations for the analysis of the end user performance, which are performed on the application server 200/performance information saving server 300/monitoring client 400 described above with reference to FIGS. 1 to 4. The performance analysis component 200-1 may be a group of components (or at least one of components) for the analysis of the end user performance, which is installed in the application server described above with reference to FIGS. 1 to 4. The performance analysis component 200-1 may be implemented for performance analysis of an application 200-2 installed in the application server.

For example, the performance analysis component 200-1 may be implemented for monitoring a page provided by the application server to the end user based on the monitoring script, and the monitoring script may collect the monitoring information about event information generated in the page to provide the monitoring information to the end user performance collector.

In detail, the performance analysis component 200-1 may add the monitoring script to a replay by the application to service the HTML page with the web browser, and the monitoring script may collect and provide the end user performance monitoring information on an event occurring in the HTML page.

The performance analysis component 200-1 may generate a unique identifier for the end user on the web browser and may generate the page manager and the page info for the end user by using the unique identifier as a key to store the page manager and the page info, the page manager may be implemented to manage n page info (where n is a natural number) in the internal structure, and the page info may include information for tracking end-to-end performance.

The monitoring script may parse a response stream for generating the HTML page to insert the monitoring script link at a preset monitoring link insertion position, and a transmission length of the response stream is redefined in consideration of a length of the monitoring script link.

The page info may further include matching information for linking the end user performance monitoring information of the HTML page with the call relation between the HTML pages and the processing performance information of the HTML page and the application. The end user performance monitoring information may be sent to the end user performance collector based on the matching information to generate the end-to-end end user performance information. The end user performance collector may provide the end user performance information generated based on the end user performance monitoring information according to the end user monitoring type, and the end user monitoring type may be classified according to a format of the page.

The embodiments according to the present invention as described above may be implemented in the form of program instructions that can be executed by various computer components, and may be stored on a computer-readable recording medium. The computer-readable recording medium may include program instructions, data files, data structures, and the like alone or in combination. The program instructions stored on the computer-readable recording medium may be specially designed and configured for the present invention, or may also be known and available to those skilled in the computer software field. Examples of the computer-readable recording medium include: magnetic media such as hard disks, floppy disks, and magnetic tapes; optical recording media such as CD-ROMs and DVDs; magneto-optical media such as floptical disks; and hardware devices specially configured to store and execute program instructions, such as ROM, RAM, and flash memories. Examples of the program instructions include not only machine language codes created by a compiler or the like, but also high-level language codes that can be executed by a computer using an interpreter or the like. The hardware devices may be changed into one or more software modules to perform the operations of the present invention, and vice versa.

Although the present invention has been described above in connection with specific limitations such as detailed components as well as limited embodiments and drawings, these are merely provided to assist a better understanding generally of the invention, and the present invention is not limited to the above embodiments. In addition, it shall be understood that various changes and modifications can be made from the above description by those skilled in the art to which the invention pertains.

Therefore, the spirit of the present invention shall not be limited to the above-described embodiments, and the entire scope of the appended claims and their equivalents will fall within the scope and spirit of the invention

The invention claimed is:

1. A method for automatically analyzing end-to-end end user performance, the method comprising:
   receiving a performance analysis component by an application server; and
   installing the performance analysis component by the application server,
   wherein the performance analysis component adds a monitoring script to a reply by an application to service a HTML (Hypertext Markup Language) page with a web browser, and the monitoring script collects and provides end user performance monitoring information on an event occurring in the HTML page,
   wherein the performance analysis component generates a unique identifier for an end user on the web browser and generates a page manager and a page info for the end user by using the unique identifier as a key to store the page manager and the page info, the page manager is implemented to manage n page info (where n is a natural number) in an internal structure, and the page info includes information for tracking end-to-end performance,
   wherein the monitoring script parses a response stream for generating the HTML page to insert a monitoring script link at a preset monitoring link insertion position, and a transmission length of the response stream is redefined in consideration of a length of the monitoring script link,
   wherein a string length of the monitoring script link added after inserting the monitoring script link at the preset monitoring link insertion position is added to the transmission length to send the response stream.

2. The method of claim 1,
   wherein the page info further includes matching information for linking the end user performance monitoring information of the HTML page with call relation between HTML pages and processing performance information of the HTML page and the application, and
   the end user performance monitoring information is sent to an end user performance collector based on the matching information to generate end-to-end end user performance information.

3. The method of claim 2,
   wherein the end user performance collector provides end user performance information generated based on the end user performance monitoring information depending on an end user monitoring type, and
   the end user monitoring type is classified depending on a format of the page.

4. An application server which is an analysis target for analyzing end-to-end end user performance, the application server comprising:
   a communication unit implemented to receive a performance analysis component; and
   a processor operatively connected with the communication unit,
   wherein the processor is implemented to install the performance analysis component, the performance analysis component adds a monitoring script to a reply by an application to service a HTML (Hypertext Markup Language) page with a web browser, and the monitoring script collects and provides end user performance monitoring information on an event occurring in the HTML page, wherein the performance analysis component generates a unique identifier for an end user on the web browser and generates a page manager and a page info for the end user by using the unique identifier as a key to store the page manager and the page info, the page manager is implemented to manage n page info (where n is a natural number) in an internal structure, and the page info includes information for tracking end-to-end performance, wherein the monitoring script parses a response stream for generating the HTML page to insert a monitoring script link at a preset monitoring link insertion position, and a transmission length of the response stream is redefined in consideration of a length of the monitoring script link, wherein a string length of the monitoring script link added after inserting the monitoring script link at the preset monitoring link insertion position is added to the transmission length to send the response stream.

5. The application server of claim 4, wherein the page info further includes matching information for linking the end user performance monitoring information of the HTML page with call relation between HTML pages and processing performance information of the HTML page and the application, and the end user performance monitoring information is sent to an end user performance collector based on the matching information to generate end-to-end end user performance information.

6. The application server of claim 5, wherein the end user performance collector provides end user performance information generated based on the end user performance monitoring information depending on an end user monitoring type, and the end user monitoring type is classified according to a format of the page.

7. A non-transitory computer-readable recording medium having instructions for:

receiving a performance analysis component by an application server; and installing the performance analysis component by the application server, wherein the performance analysis component adds a monitoring script to a reply by an application to service a HTML (Hypertext Markup Language) page with a web browser, and the monitoring script collects and provides end user performance monitoring information on an event occurring in the HTML page, wherein the performance analysis component generates a unique identifier for an end user on the web browser and generates a page manager and a page info for the end user by using the unique identifier as a key to store the page manager and the page info, the page manager is implemented to manage n page info (where n is a natural number) in an internal structure, and the page info includes information for tracking end-to-end performance, wherein the monitoring script parses a response stream for generating the HTML page to insert a monitoring script link at a preset monitoring link insertion position, and a transmission length of the response stream is redefined in consideration of a length of the monitoring script link, wherein a string length of the monitoring script link added after inserting the monitoring script link at the preset monitoring link insertion position is added to the transmission length to send the response stream.

\* \* \* \* \*